United States Patent
Cohen et al.

(10) Patent No.: US 10,740,782 B2
(45) Date of Patent: Aug. 11, 2020

(54) COMPUTERIZED PROMOTION PRICE SCHEDULING UTILIZING MULTIPLE PRODUCT DEMAND MODEL

(71) Applicant: ORACLE INTERNATIONAL CORPORATION, Redwood Shores, CA (US)

(72) Inventors: Maxime Cohen, New York, NY (US); Jeremy Kalas, Huntington, NY (US); Kiran Panchamgam, Bedford, MA (US); Georgia Perakis, Belmont, MA (US)

(73) Assignees: ORACLE INTERNATIONAL CORPOATION, Redwood Shores, CA (US); MASSACHUSETS INSTITUTE OF TECHNOLOGY, Cambridge, MA (US)

( * ) Notice: Subject to any disclaimer, the term of this patent is extended or adjusted under 35 U.S.C. 154(b) by 692 days.

(21) Appl. No.: 14/942,225

(22) Filed: Nov. 16, 2015

(65) Prior Publication Data

US 2017/0140414 A1 May 18, 2017

(51) Int. Cl.
*G06Q 30/02* (2012.01)

(52) U.S. Cl.
CPC ............... *G06Q 30/0235* (2013.01)

(58) Field of Classification Search
CPC . G06Q 30/0235; G06Q 30/02; G06Q 30/0283
See application file for complete search history.

(56) References Cited

U.S. PATENT DOCUMENTS

| | | | |
|---|---|---|---|
| 7,660,734 B1 * | 2/2010 | Neal | G06Q 10/06 705/7.29 |
| 7,912,748 B1 * | 3/2011 | Rosenberg | G06Q 10/087 705/1.1 |

(Continued)

OTHER PUBLICATIONS

Chakravarty, A.K. and Martin, G.E., 1989. Discount pricing policies for inventories subject to declining demand. Naval Research Logistics (NRL), 36(1), pp. 89-102. (Year: 1989).*

(Continued)

*Primary Examiner* — Luis A Brown
*Assistant Examiner* — Robert C Johnson
(74) *Attorney, Agent, or Firm* — Kraguljac Law Group, LLC (57) ABSTRACT

Systems, methods, and other embodiments associated with determining a promotion price schedule for each item in a group are described. In one embodiment, a method includes computing an item coefficient that corresponds to a change in a value of an objective function when the item is priced at the promotion price. The objective function is based on a multiple product demand model. An item coefficient is computed for each item, each time period in the price schedule, and each promotion price in a price ladder for the item. An approximate objective function is formulated that includes products of item coefficients and binary decision variables. The item coefficients, the approximate objective function, and constraints are provided to an optimizer that determines values of the decision variables that maximize the approximate objective function. A promotion price schedule is created for each item based on values of the decision variables.

18 Claims, 4 Drawing Sheets

(56) References Cited

U.S. PATENT DOCUMENTS

| | | | |
|---|---|---|---|
| 2002/0046110 A1* | 4/2002 | Gallagher | G06Q 20/06 705/14.13 |
| 2005/0071223 A1* | 3/2005 | Jain | G06O 30/02 705/14.13 |
| 2005/0256778 A1* | 11/2005 | Boyd | G06Q 30/0244 705/14.43 |
| 2010/0145773 A1* | 6/2010 | Desai | G06Q 30/0235 705/7.29 |
| 2013/0132153 A1* | 5/2013 | Vakhutinsky | G06Q 30/0283 705/7.31 |
| 2013/0275183 A1* | 10/2013 | Cohen | G06Q 30/02 705/7.35 |
| 2015/0081393 A1 | 3/2015 | Cohen et al. | |

OTHER PUBLICATIONS

Slade, M.E. and GREQAM, 1998. Optimal pricing with costly adjustment: evidence from retail-grocery prices. The Review of Economic Studies, 65(1), pp. 87-107. (Year: 1998).*

PTAB Decision dated Aug. 7, 2017 in co-pending U.S. Appl. No. 13/481,140 having a date of mailing of May 23, 2018. (16 pgs).

\* cited by examiner

COMPUTERIZED PROMOTION PRICE SCHEDULING UTILIZING MULTIPLE PRODUCT DEMAND MODEL

BACKGROUND

Retailers use promotions as a driver to boost sales of products and/or profits. Promotions are temporary in nature, typically lasting a week or two and are associated with a price discount over a regular price for a product/item. A promotion price schedule for an item specifies upcoming time periods (e.g., weeks) during which the item will be assigned a discounted price. Given that modern retailers deal in hundreds or thousands of items, many of which are related to one another such that the pricing of one item may affect demand for another item, creating a promotion price schedule that maximizes a retailer's goals is challenging.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Promotion planning for multiple products is a very challenging problem in which a retailer decides which products to promote, which promotional vehicles to use, the depth of a discount, and when to schedule the promotion. The retailer has to make these decisions for hundreds or even thousands of items. For the purposes of this description, an "item" is a product/good sold by a retailer that is assigned a stock keeping unit (SKU). When scheduling promotions for multiple products, retailers should consider both the "stockpiling effect" and "cannibalization."

The stockpiling effect is the cross-effect between a given item's current price and its prior prices. For example, if a consumer's favorite brand of yogurt goes on sale, the consumer may buy two weeks' worth of yogurt on a weekly trip to the market. Thus, the favorite yogurt's current low price, as compared to its prior price, causes the consumer to stockpile the favorite yogurt. Cannibalization is the cross effect between a given item's price and demand for other related items. For example, if a competing brand of yogurt goes on sale, the consumer may buy that brand instead of the favorite brand. Thus the consumer's demand for the favorite yogurt is cannibalized by the promotion price of the competing yogurt.

Multiple product demand models have been developed that include the effects of both the past price of a given item (stockpiling effect) and the current price of related items (cannibalization) when predicting demand for the item. Obviously, multiple product demand models are complex models that are non-linear in nature. This makes promotion price scheduling difficult because of the mathematical complexity of selecting promotion prices that maximize the multiple product demand for any significant number of items. In addition, a retailer may also have some business related constraints on how promotion prices should be set.

The presence of business rule constraints and the complexity of multiple product demand models make promotion scheduling difficult to solve optimally and often a high-quality approximation is intractable. Since in general a profit function cannot be assumed to be convex or concave, promotion scheduling problems cannot be solved satisfactorily by gradient methods. In addition, enumeration based solutions are not tractable because the number of possibilities grows exponentially as the number of items increases. Thus, prior to the present system, promotion scheduling using a multiple product demand model with any significant number of products has been infeasible, even with the use of computerized optimizers. This means that prior promotion scheduling is typically based on a single product demand model, which fails to take into account the effects of stockpiling and cannibalization, possibly resulting in less accurate results.

Computerized systems and methods are described herein that generate a promotion price schedule in electronic form that utilizes a multiple product demand model and takes into account business related constraints on item pricing. In one embodiment, the computerized system is configured to recognize the discrete nature of some of the input variables, such as price, and pre-compute a limited set of coefficients based on possible values of the discrete variables and a multiple product demand model. An integer programming solution is configured to process the limited set of coefficients to generate a price schedule that optimizes an objective function (e.g., the objective function is selectable as profit or revenue). The present system generates an improved price schedule that assists a retail entity to electronically control and adjust prices of items in inventory to increase profit and/or revenue.

Figure 1:
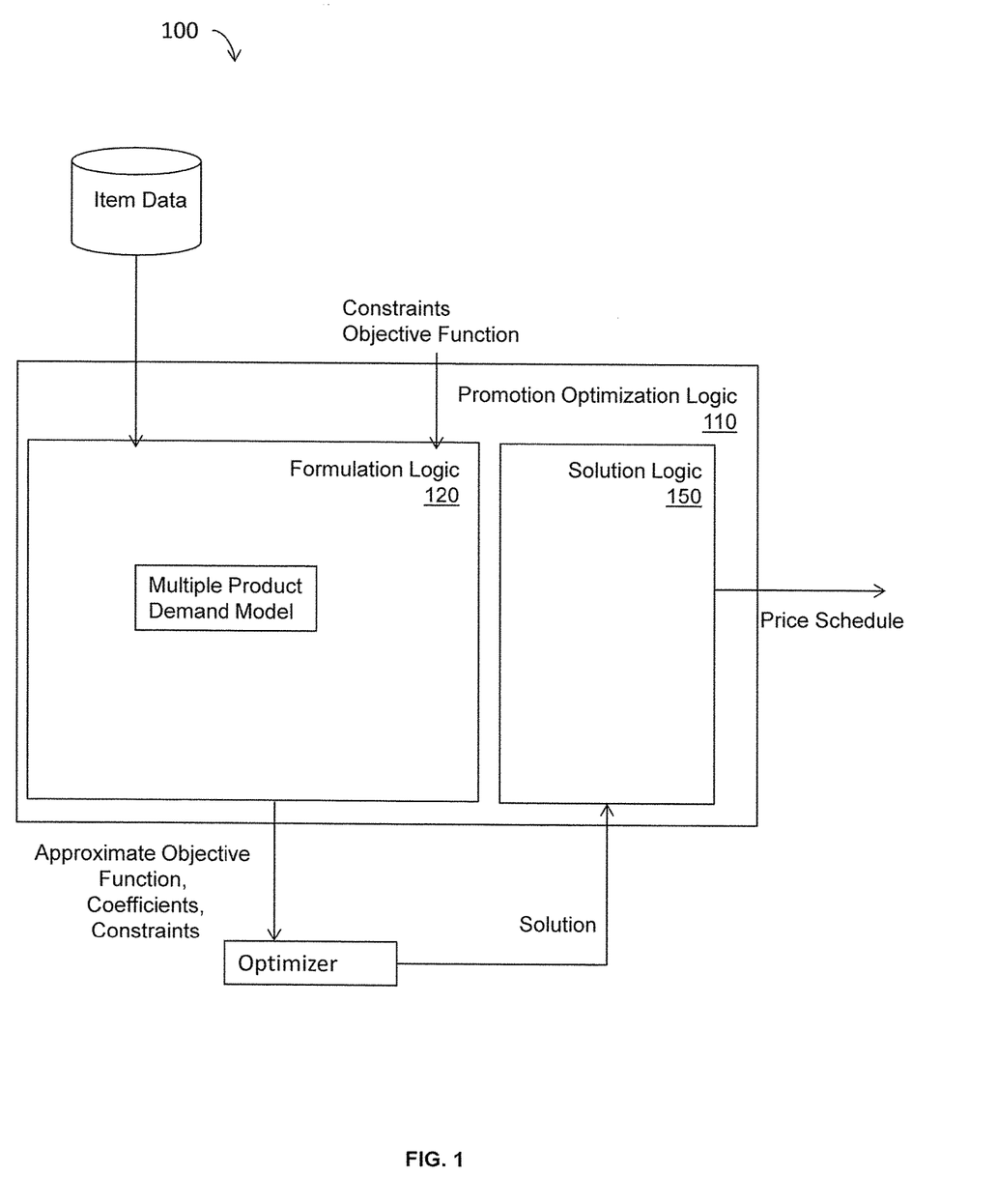
FIG. 1 illustrates one embodiment of a system associated with promotion price scheduling utilizing a multiple product demand model.

FIG. 1 illustrates one embodiment of a computerized system 100 that determines and generates a promotion price schedule for a set of items. The promotions price schedule is, for example, a data structure stored in memory that contains data values and/or records for information as described herein. The system 100 includes promotion optimization logic 110 that controls a processor to perform various operations described below (see FIG. 4). In one embodiment, promotion optimization logic 110 is implemented as computer instructions embodied in a module stored in a non-transitory computer-readable medium where the instructions are configured as an executable algorithm configured to perform the functions as described herein when executed by at least the processor of a computing device.

The promotion optimization logic 110 interacts by way of electronic communication over network or internet connection with a computing device of a retailer. For the purposes of this description, the term "retailer" or "requesting device" is intended to include a computing device under the control of a retailer who prices items for sale and who is requesting, from the system 100, a promotion price schedule for items sold by the retailer. The price optimization logic 110 is configured to receive electronic communications from the remote computing device of the retailer that communicate constraints and a selected objective function. The constraints limit pricing possibilities for the items based on the retailer's business rules. One constraint is as a price ladder for each item. The price ladder is a set of promotion prices to be considered for the item.

The constraints are encoded in an electronic data structure, such as a table, that stores constraint data corresponding to a mathematical expression of the constraints. The constraint data is input to and is interpretable by the price optimization logic 110. Alternatively, the price optimization logic 110 may store the constraint data and the retailer may communicate data identifying selected constraints to be enforced from among the stored constraints. The electronic communication from the retailer may also include data that defines values for various attributes in the constraints that depend on the retailer's specific business rules. The price optimization logic 110 is configured to access a database that stores records having data corresponding to retailer sales data for various items (e.g., item price history and cost of the item). To input or receive item data for a set of items subject to promotion price scheduling, the price optimization logic 110 queries the database for item data (e.g., electronic records) that describe the set of items.

The promotion optimization logic 110 includes formulation logic 120 that formulates an approximate objective function based on the item data using a multiple product demand model and the objective function selected by the retailer. The multiple product demand model is a stored set of instructions that, when executed by a processor, computes demand for an item based on past prices for the item and current prices of other items. The promotion optimization logic 110 also calculates a limited set of coefficients that will be used by the optimizer to determine the price optimization schedule. Each coefficient is data that corresponds to the output of the multiple product demand model in response to given set of inputs. The promotion optimization logic 110 provides the approximate objective function and the constraints to a computerized optimizer (e.g., integer programming solution) by transmitting data structures that encode the coefficients, the approximate objective function, and the constraints.

The computerized optimizer determines a target solution to the approximate objective function as constrained by the constraints where the target solution is generated to improve the selected objective function (i.e., increase profit or increase revenue). The promotion optimization logic 110 includes solution logic 150 that creates a price schedule for each item based on the target solution determined by the optimizer. The solution logic 150 may also calculate the profit (or sales or revenue) that will result from the price schedule. The price schedule created by the solution logic 150 is electronically transmitted, by way of a network or internet connection, to a computing device of the retailer that controls pricing. The computing device of the retailer is caused to use the price schedule for electronically controlling and changing prices for items in associated database records and scheduling promotions for the items being sold. In this manner, the retailer is able to price items according to the price schedule to maximize their selected objective function (e.g., increase profit and/or increase revenue) while enforcing business rules of the company.

Multiple Product Demand Model:

In one embodiment, the multiple product demand model utilized by the formulation logic 120 assumes infinite population with myopic (non-strategic) customers. The demand at time t is expressed as a given non-linear and time-dependent function $d_t^i = f_t(p_t^i, \ldots, p_{t-M_i}^i, p_t^{-i})$. This function says that the demand for an item i at time period t, depends on its past M prices and also the current prices of other items within the category (denoted by $p_t^{-i}$). Note that this set of items can be restricted to items that are substitutes for this item i. Past prices of an item (that is $p_t^i, \ldots, p_{t-M_i}^i$) captures the stockpiling effect and later ($p_t^{-i}$) captures the cannibalization effect. Two such examples of demand models are:

Multiplicative $d_t^i =$ EQ 1

$$BaseDemand_t^i * \left(\frac{p_t^i}{p_o^i}\right)^{-\gamma_i} * \prod_{m=1}^{M_i}\left(\frac{p_{t-m}^i}{p_o^i}\right)^{\delta_i^m} * \prod_{j \neq i}\left(\frac{p_t^j}{p_0^j}\right)^{+\beta_{ji}}$$

Additive $d_t^i =$ EQ 2

$$BaseDemand_t^i - \gamma_i\left(\frac{p_t^i}{p_o^i}\right) + \sum_{m=1}^{M_i}\delta_i^m\left(\frac{p_{t-m}^i}{p_o^i}\right) + \sum_{j \neq i}\beta_{ji}\left(\frac{p_{t-m}^i}{p_0^i}\right)$$

The multiple product demand model can be any generalized functional form of multiplicative or additive demand models or any convex combination of the multiplicative and additive demand models such as:

Multiplicative: $d_t^i = f_t(p_t^i) \cdot g_1(p_{t-1}^i) \cdot g_1(p_{t-2}^i) \ldots g_1(p_{t-M_i}^i) \cdot \Pi_{j \neq i}(p_t^j)$ EQ 3

Additive: $d_t^i = f_t(p_t^i) \cdot g_1(p_{t-1}^i) + g_1(p_{t-2}^i) \ldots + g_1(p_{t-M_i}^i) + \Sigma_{j \neq i}(p_t^j)$ EQ4

Business Related Constraints

A user of the system 100 may selectively enable and specify several different business related constraints. Example business related constraints will now be described. Of course, any number of other constraints on possible prices for items may be presented to the optimizer to constrain the optimizer's solution in accordance with a retailer's pricing policies.

A "self no-touch" constraint models the fact that two consecutive promotions of a specific item should be separated by a few time periods (e.g., minimum of two weeks between consecutive promotions). A retailer may choose to enable this constraint for certain (or all) items and, for each item, specify the minimum number of time periods between consecutive promotions. One possible mathematical formulation of the "self no-touch" constraint suitable for input to an MIP solver is presented in mathematical form as constraint C2 in appendix A.

A "cross no-touch" constraint models the fact that two consecutive promotions of any two different items should be separated by a few time periods (e.g., minimum of two weeks between consecutive promotions for yogurt of any brand). A retailer may choose to enable this constraint for certain (or all) sets of items and, for each set of items, specify the minimum number of time periods between consecutive promotions. One possible mathematical formulation of the "cross no-touch" constraint suitable for input to an MIP solver is presented in mathematical form as constraint C3 in appendix A.

A limitation on "price changes per item" constraint recognizes the tendency for frequent promotions to devalue the way customers perceive an item. In addition, this constraint can be motivated by high labeling costs and other business requirements. For example a retailer may define a limitation on price changes for an item constraint that specifies that the item cannot be promoted more than 9 times in a year. A retailer may choose to enable this constraint for certain (or all) items and, for each item, specify the maximum number of times the item may be promoted in the planning horizon (i.e., the period being scheduled). One possible mathematical formulation of the limitation on "price changes per item" constraint suitable for input to an MIP solver is presented in mathematical form as constraint C4 in appendix A.

A limitation on "price changes per period" recognizes that a retailer may not want to put the entire category on sale at the same time. For example, out of 100 products in a category, a retailer may want to limit the promotions to at most 10 products. A retailer may choose to enable this constraint for certain (or all) categories of items and, for each category, specify the maximum number or percentage of items that may be promoted at the same time. One possible mathematical formulation of the limitation on "price changes per period" constraint suitable for input to an MIP solver is presented in mathematical form as constraint C5 in appendix A.

A limitation on "price changes per category" constraint allows a retailer to limit how many promotions can be done for an entire category over the course of the entire planning horizon. A retailer may choose to enable this constraint for certain (or all) categories and, for each category, specify the maximum number of promotions that can be done in the planning horizon. One possible mathematical formulation of the limitation on "price changes per category constraint" suitable for input to an MIP solver is presented in mathematical form as constraint C6 in appendix A.

Set constraints include "must-promote sets of items" and "cannot-promote sets of items." Items in a "must-promote set" must be promoted together. For example, if there are three products of a shampoo brand (e.g., shampoo, conditioner, and hair spray), a retailer may want to put all the three products on promotion at the same time. A retailer may choose to enable the must-promote set constraint for certain sets of items. Items in a "cannot-promote set" cannot be promoted together. For example, a retailer may not want to put a highly popular shampoo product and a low-seller shampoo product on promotion at the same time. A retailer may choose to enable the "cannot-promote set" constraint for certain sets of items. One possible mathematical formulation of the must-promote set constraint and the "cannot-promote set" constraint suitable for input to an MIP solver is presented in mathematical form as constraints C7 and C8, respectively, in appendix A.

Inter-item constraints can be used by a retailer to impose price restrictions that maintain the price order between two items. For example, a retailer may want to specify that the price of a national brand item should always be higher than a private label brand item. Another example would be to maintain the price relation between a 2-pack of 2-liter Coke bottles and a 4-pack of 2-liter Coke bottles. A retailer may choose to enable the inter-item constraints for certain sets of items. The retailer specifies the relationships between prices of items in the set that must be maintained. One possible mathematical formulation of the "cross no-touch" constraint suitable for input to an MIP solver is presented in mathematical form as constraint C9 in appendix A.

Recall that the item data input to the promotion optimization logic 110 includes a set of possible promotion prices to be considered by the system 100. This set of possible promotion prices or "price ladder" limits the number of solutions that must be considered by the optimizer and makes the price variable in the multiple product demand model into a discrete, rather than continuous variable. Thus, the price ladder is one feature that makes a linear approximation of the promotion optimization problem possible. A retailer may choose to limit the number of promotion prices in the price ladder to increase the speed with which a solution may be found by the optimizer. In addition, the retailer may include prices in the price ladder that reflect a price increase over the current price of the item. For the purposes of this description, even though the price ladder constrains possible prices, the price ladder is not considered a "business related constraint" because its true purpose is to simplify the optimization process. One possible mathematical formulation of the price ladder constraint suitable for input to an MIP solver is presented in mathematical form as the price calculation constraint C1 in appendix A.

Figure 2:
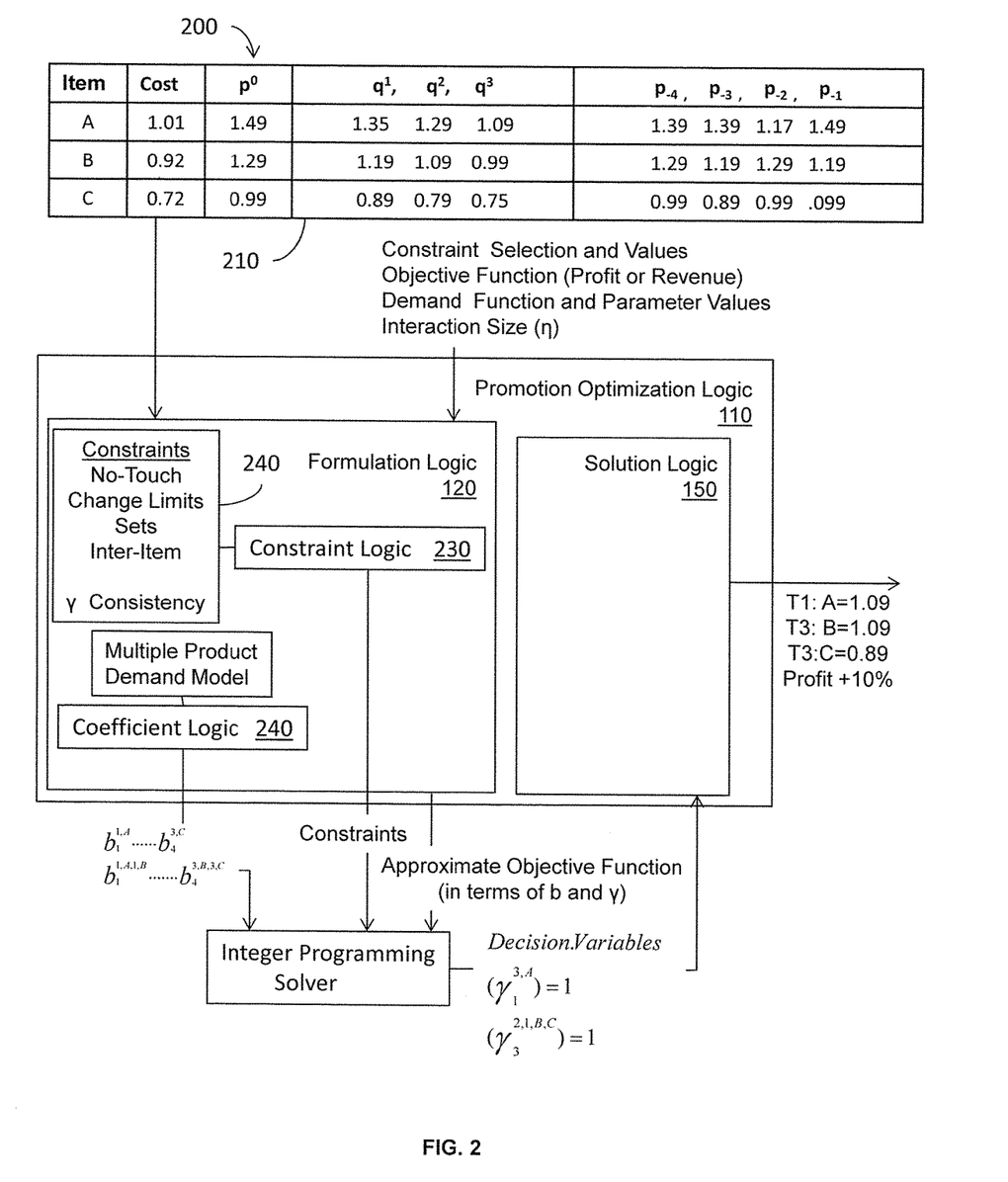
FIG. 2 illustrates one example embodiment of the system of FIG. 1.

FIG. 2 illustrates one example embodiment of a computing system 200 that creates a promotion price schedule for a set of items sold by a retailer. The system 200 includes one embodiment of the promotion optimization logic 110 of FIG. 1. The promotion optimization logic 110 inputs item data 210 that includes an item cost (used in profit calculation), the item's non-promotion price) ($p^0$), a price ladder for the item ($q^1$, $q^2$, and $q^3$), and the item's prices for recent periods ($p_{-4}$, $p_{-3}$, $p_{-2}$, $p_{-1}$). In the example in FIG. 2, the item data includes three items A, B, and C. Item A has a cost of $1.01, a non-promotion price of $1.49, a price ladder {$1.35, $1.29, $1.09}, and past prices of $1.39 four weeks ago, $1.39 three weeks ago, $1.17 two weeks ago, and $1.49 one week ago. While three prices are in the price ladder of FIG. 2, any number of prices may be included in the price ladder for consideration by the promotion optimization logic 110, recognizing that more prices may improve results but will increase the complexity of the optimization. Likewise, while four periods of historical prices are shown in FIG. 2, any number of periods may be considered by the promotion optimization logic 110, as appropriate.

In addition to the item data, the promotion optimization logic 110 inputs retailer selections that tailor constraints to the retailer's business rules and preferences. The formulation logic 120 includes constraints data that define each business related constraint (e.g., the business related constraints described above and listed in the constraints box in FIG. 2). The constraints data includes parameters whose values can be input by the retailer. The retailer selects one or more of the business related constraints and specifies parameter values (e.g., time periods between consecutive promotions, minimum or maximum numbers of items, item sets, and so on) for the selected constraints. Constraint logic 230 combines the input parameters with the selected constraints to create a set of constraints that will be input to an integer programming solution which serves as the optimizer of FIG. 1. See Appendix A for a mathematical formulation of example business related constraints suitable for input to an integer programming solver.

The retailer may also select an objective function to be used in generating the solution. Typically, the objective function will either be profit or revenue. The retailer chooses a multiple product demand model and inputs parameters that fit the model to the retailer's specific context. The demand model may be any time-dependent, non-linear demand function.

In one embodiment, the retailer also selects an interaction size ($\eta$). The interaction size specifies a number of items to be considered as simultaneously promoted in formulating the approximate objective function. In a simplest embodiment, the interaction size is 1 and, as will be described in more detail below, the approximate objective function is formulated on the basis of the contribution to demand when each single item is given a promotion price and the rest of the items are at their regular (i.e., non-promotion or $p^0$) price.

If the retailer chooses an interaction size of two, the approximate objective function is formulated on the basis of i) the contribution to demand when each single item is given a promotion price and the rest of the items are at their regular price and also ii) the contribution to demand when each pair of items are both on promotion and all other items are at their regular price. Of course, since multiple items will likely be on promotion at any given time, a lower interaction size, while simple and less computationally intensive, will yield less accurate results that a larger interaction size. It has been found that an interaction size of 2 usually provides sufficiently accurate results.

For the purposes of the remaining description, the following notation will be used.
1. N is the number of items in a category.
2. Vector $p^0$ is defined as the regular price for all items at all times (note regular prices can be different for each item and time period). For example,

| Product 1 | ... | | Product j | ... | | Product N | |
|---|---|---|---|---|---|---|---|
| $p_{t=1}^{j=1}$ | ... | $p_{t=T}^{j=1}$ | ... | $p_{t=1}^{j}$ | ... | $p_{t=T}^{j}$ | ... | $p_{t=1}^{j=N}$ | ... | $p_{t=T}^{j=N}$ |

3. The price ladder for an item j is defined as follows (in decreasing order of prices): $\{p^{0,j}, q^{1,j} \ldots, q^{k,j}, \ldots q^{K_j,j}\}$. Note that this approach allows the price ladder to vary with time, and also potentially include prices that are higher than the regular price (even though this situation rarely occurs in promotion planning practice).
4. Vector $p_t^{k,j}$ is defined as promotion price $q^{k,j}$ for item j at time t and regular price $p^{0,j}$ for all other time periods.

| Product 1 | ... | | Product j | ... | | Product N | |
|---|---|---|---|---|---|---|---|
| $p_{t=1}^{j=1}$ | ... | $p_{t=T}^{j=1}$ | ... | $p_{t=1}^{j}$ | ... | $p_t^{j} = q^{k,j}$ | ... | $p_{t=1}^{j=N}$ | ... | $p_{t=T}^{j=N}$ |

5. Vector $p_t^{k,lj,u}$ is defined as promotion price $q^{k,j}$ for item j, promotion price $q^{l,u}$ for item u at time t and regular price $p^{0,j}$, $p^{0,u}$ for all other time periods of these items and regular price for all other items at all times.
6. The binary variable $\alpha_t^{j,k}$ is equal to 1 if the price at time t is set to $q^{j,k}$ and 0 otherwise.
7. POP($p^0$) represents the total profit (or revenue) when all items are set at regular prices for all time periods. POP($p_t^{k,j}$) represents the total profit (or revenue) when all items are set at regular prices except item j at time period t is set a promotion price of $q_t^{k,j}$. Profit (or revenue) is calculated using the selected multiple product demand model that takes into account stockpiling and cannibalization effects.

When the interaction size ($\eta$) is selected as 1, coefficient logic 240 uses the selected multiple product demand model to compute coefficients, $b_t^{k,j}$ for the $k^{th}$ price point of item j's price ladder at time t. Each coefficient $b_t^{k,j}$ represents the change in the total aggregated profits (or any other alternative objective function) when the price of item j at time t is selected to be equal to $q^{k,j}$ in the price ladder and all the other prices of all other items at all times are set to $p^0$ (regular non-promotion price). Equation 5 mathematically defines $b_t^{k,j}$ in terms of profits.

$$b_t^{k,j} = POP(p_t^{k,j}) - POP(p^0) \quad \text{EQ 5}$$

If $\eta=2$, the coefficient logic 240 also computes the coefficients, $b_t^{l,u}$ for item u and $l^{th}$ point in the price ladder at time t as described in Equation 5. The coefficient logic 240 also computes coefficients $b_t^{klj,u}$ for price points $k^{th}$ and $i^{th}$ of items j and u's price ladder respectively as described by Equation 6. To avoid double counting for the second coefficient, the coefficient logic 240 considers item pairs (j,u) such that j>u. Each coefficient $b_t^{klj,u}$ represents the additional changes in the total aggregated profits (or any other alternative objective function) when the prices of items j and u at time t are selected to be equal to $q^{k,j}$, $q^{l,u}$ in the price ladder, respectively, compared to when both the items are not promoted and promoted one at a time (all the other prices of all other items at all times are set to their regular non-promotion price). Equation 6 mathematically defines $b_t^{klj,u}$ in terms of profits (or revenues).

$$b_t^{klj,u} = POP(p_t^{klj,u}) - POP(p_t^{k,j}) - POP(p_t^{l,u}) + POP(p^0) \quad \text{EQ 6}$$

If $\eta \geq 3$, the coefficient logic 230 computes coefficients for each $\eta$-tuples in a similar fashion.

As will be described in more detail below, the approximate objective function will be formulated to include products of the coefficients and respective binary decision variables, which are designated as $\gamma$. When $\eta$ is greater than one, the constraint logic 230 adds consistency constraints on $\gamma$ based on $\eta$'s value. For example, when $\eta=2$, the following four consistency constraints are enforced on the value of $\gamma$ for each pair of items (j,u) where j>u at each time t:

$$\gamma_t^{klj,u} \leq \gamma_t^{k,j}, \gamma_t^{klj,u} \leq \gamma_t^{l,u}, \gamma_t^{klj,u} \geq 0, \gamma_t^{klj,u} \geq \gamma_t^{k,j} + \gamma_t^{l,u} - 1$$

If $\eta=3$, analogous consistency constraints are used. The consistency constraints are stored in the constraints data for selection by the constraint logic 230 based on the selected interaction size. The consistency constraints are provided, along with the retailer's selected business related constraints, to the integer programming solver.

The formulation logic 120 formulates the approximate objective function (e.g. total profits) as follows:

If $\eta=1$, the objective function is calculated as the sum of the incremental profits of having one price change at a time. More specifically, the approximate objective function is formulated as the sum of the respective products of respective coefficients (calculated by the coefficient logic 240) and respective binary decision variables $\gamma_t^{k,j}$ over all the items, time periods and price ladder. Mathematically, the approximate objective function, when $\eta=1$, is:

$$\pi(p^0) + \sum_{j=1}^{N} \sum_{t=1}^{T} \sum_{k=1}^{K_j} b_t^{k,j} \gamma_t^{k,j} \quad \text{EQ 7}$$

where $\pi(p^0)$ is the objective function when all the prices are equal to $p^0$. All other constraints (e.g., business related constraints, price ladder, and consistency constraints) are linear by definition and do not need to be changed.

If $\eta=2$, the approximate objective function is formulated as the sum of the incremental profits of having one price change at a time and the pair-wise additional contributions. More specifically, the approximate objective function is formulated as the sum of respective products of respective coefficients (calculated by the coefficient logic 240) and respective binary decision variables $\gamma_t^{kj}$ and $\gamma_t^{lu}$ over all the items, item-pairs, time periods and price ladder. Mathematically, the approximate objective function can be expressed as follows:

$$\pi(p^0) + \sum_{j=1}^{N}\sum_{t=1}^{T}\sum_{k=1}^{Kj} b_t^{kj}\gamma_t^{kj} + \sum_{j,u;j>u}\sum_{t=1}^{T}\sum_{k=1}^{Kj}\sum_{l=1}^{Ku} b_t^{klju}\gamma_t^{klju} \qquad \text{EQ 8}$$

where $\pi(p^0)$ is the objective function when all the prices are equal to $p^0$. All other constraints (e.g., business related constraints, price ladder, and consistency constraints) are linear by definition and do not need to be changed. If $\eta \geq 3$, the formulation logic 120 formulates the approximate objective function in a similar fashion.

The formulation logic 120 thus compiles a mixed integer problem (MIP) that includes the approximate objective function and the selected business related constraints and consistency constraints (if any). The MIP is provided to the IP solver. The integer solution $(\gamma_t^{kj})^*$, $(\gamma_t^{klju})^*$ is determined which specifies which decision values are 1 and which are 0. The values of the decision variables are input to the solution logic 150. The solution logic 150 identifies coefficients associated with the decision variables having a value of one. The solution logic 150 then uses the identified coefficients to create a promotion schedule for each item.

In the example in FIG. 2, the IP solver outputs, as the solution, the set of decision variable values is $\gamma_1^{3,A}=1$ and $\gamma_3^{2,1BC}=1$, with all other decision variables equal to 0. Thus, the promotion price schedule created by the solution logic 150 will have all items at their non-promotion price at each period in the schedule except in Period 1, Item A will have its price set to $q^3$ or $1.09 and in Period 3, Item B will have its price set to $q^2$ or $1.09 and Item C will have its price set to $q^1$ or $0.89. The promotion price schedule is output by the promotion optimization logic 110 for use by the retailer in setting its prices. In addition, the promotion optimization logic 110 may output the expected increase in profit (or revenue) as compared to the profit (or revenue) when all items remain at their non-promotion price throughout the planning horizon.

In one embodiment, the system 200 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the promotion optimization logic 110 is a centralized server-side application that provides at least the functions disclosed herein and that is accessed by many users via computing devices/terminals communicating with the computing system 100 (functioning as the server) over a computer network.

Figure 3:
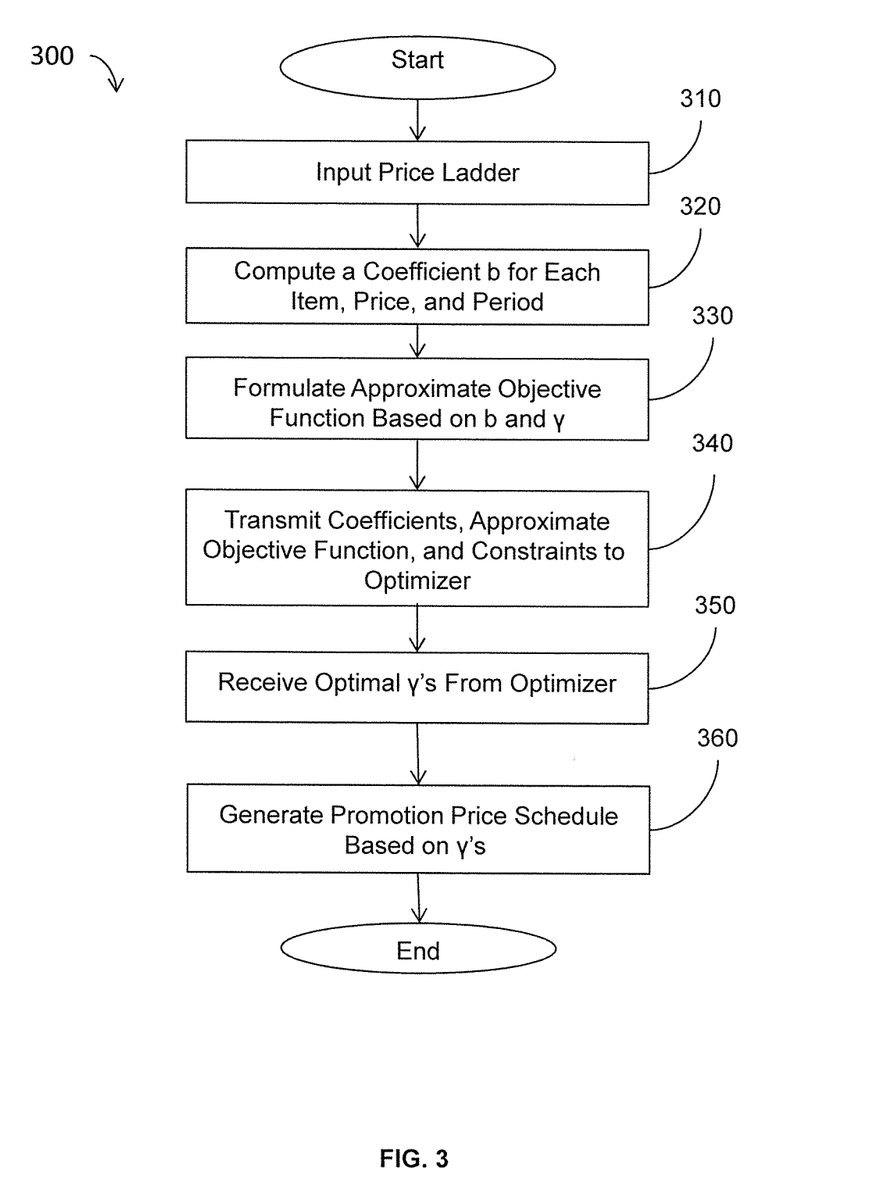
FIG. 3 illustrates one embodiment of a method associated with promotion price scheduling utilizing a multiple product demand model.

FIG. 3 illustrates one embodiment of a computer-implemented method 300 that creates a promotion price schedule utilizing a multiple product demand model. The method includes, at 310, inputting a price ladder for each item that defines a set of promotion prices for consideration. This step may be performed by the promotion optimization logic 110 or the formulation logic 120 of FIGS. 1 and 2. In one embodiment, the data corresponding to the price ladder is stored in records in a database table or other database structure that can be queried by the promotion optimization logic 110 or the formulation logic 120. In one embodiment, the price ladder data are stored in registers or memory addresses, the contents of which may be read, input, or transferred into the working memory of the promotion optimization logic 110 or the formulation logic 120. In one embodiment, data structures encoding the price ladder and a selected objective function are received by way of an electronic communication from a retailer that is parsed to identify the data structures.

At 320 item coefficients are computed. An item is computed for each item, each time period in the price schedule, and each promotion price in the item's price ladder. As described above with reference to FIG. 2, each item coefficient corresponds to a change in a value of an objective function when the item is priced at the promotion price. The objective function is based on a multiple product demand model that calculates demand based on i) past prices of the item (stockpiling effect) and ii) current prices of other items in the group (cannibalization). The item coefficients may be computed using Equation 5. This step may be performed by the promotion optimization logic 110 or the formulation logic 120 of FIGS. 1 and 2. A processor is controlled by the promotion optimization logic 110 or the formulation logic 120 to compute the item coefficients (see FIG. 4).

At 330, based on an objective function, an approximate objective function is formulated that includes respective products of respective item coefficients and respective binary item decision variables. This step may be performed by the promotion optimization logic 110 or the formulation logic 120 of FIGS. 1 and 2. The approximate objective function may be formulated by selecting a stored approximate objective function based on a retailer's selected objective function and interaction size (q) (see FIG. 2). The approximate objective functions from which a selection is made may be stored in memory or registers accessible to the promotion optimization logic 110 or the formulation logic 120. The promotion optimization logic 110 or the formulation logic 120 may query or otherwise access the memory or registers to retrieve the appropriate approximate objective function. One example approximate objective function is described by Equation 7.

At 340 the method includes populating data structures with the item coefficients, the approximate objective function, and one or more constraints and transmitting the data structures to an optimizer. This step may be performed by the promotion optimization logic 110 or the formulation logic 120 of FIGS. 1 and 2. The populating may be performed by storing data corresponding to the item coefficients, an equation that expresses the approximate objective function, and mathematical expressions for the constraints in memory that is accessible to the optimizer. Data corresponding to the item coefficients, an equation that expresses the approximate objective function, and mathematical expressions for the constraints may be transmitted, via a network connection, to the optimizer. See Appendix A for mathematical expressions for business related constraints described elsewhere herein. The optimizer is configured to determine, as constrained by the one or more constraints, values of the item decision variables that maximize the approximate objective function. In one embodiment the optimizer is an IP solver (see FIG. 2).

At 350, a data structure encoding values of the item decision variables determined by the optimizer are received from the optimizer. This step may be performed by the solution logic 150 of FIGS. 1 and 2. The data structure is stored in memory that is populated by the optimizer. The item decision variable values may be transmitted, via a network connection, to the solution logic 150.

At 360, the method includes generating a promotion price schedule for each item based, at least in part, on the values of the item decision variables. This step may be performed by the solution logic 150 of FIGS. 1 and 2. A processor is controlled by the solution logic 150 to create the promotion price schedule (see FIG. 4).

In one embodiment, when the interaction size is selected to be two, the method 300 includes for each pair of items, each time period in the price schedule, and each pair of promotion prices in the items' price ladders, computing a pair coefficient that corresponds to a change in a value of the objective function when the pair items are priced at the promotion prices. As described above with reference to FIG. 2, each pair coefficient corresponds to a change in a value of an objective function when the pair of items is priced at the promotion price. The objective function is based on a multiple product demand model that calculates demand based on i) past prices of the item (stockpiling effect) and ii) current prices of other items in the group (cannibalization). The pair coefficients may be computed using Equation 6. This step may be performed by the promotion optimization logic 110 or the formulation logic 120 of FIGS. 1 and 2. A processor is controlled by the promotion optimization logic 110 or the formulation logic 120 to compute the pair coefficients (see FIG. 4).

For the interaction size of two, the method also includes formulating the approximate objective function such that the approximate objective function includes respective products of respective pair coefficients and respective binary pair decision variables. This step may be performed by the promotion optimization logic 110 or the formulation logic 120 of FIGS. 1 and 2. The approximate objective function may be formulated by selecting a stored approximate objective function based on a retailer's selected objective function and interaction size ($\eta$) (see FIG. 2). The approximate objective functions from which a selection is made may be stored in memory or registers accessible to the promotion optimization logic 110 or the formulation logic 120. The promotion optimization logic 110 or the formulation logic 120 may query or otherwise access the memory or registers to retrieve the appropriate approximate objective function. One example approximate objective function is described by Equation 8.

For the interaction size of two, the pair coefficients are provided with the item coefficients, the approximate objective function, and one or more constraints to the optimizer. This step may be performed by the promotion optimization logic 110 or the formulation logic 120 of FIGS. 1 and 2. The providing may be performed by storing data corresponding to the pair coefficients, the item coefficients, an equation that expresses the approximate objective function, and mathematical expressions for the constraints in memory that is accessible to the optimizer. The data corresponding to the pair coefficients, the item coefficients, an equation that expresses the approximate objective function, and mathematical expressions for the constraints may be transmitted, via a network connection, to the optimizer. See Appendix A for mathematical expressions for business related constraints described elsewhere herein. The optimizer is configured to determine, as constrained by the one or more constraints, values of the item decision variables and pair decision that maximize the approximate objective function. In one embodiment the optimizer is an IP solver (see FIG. 2).

For an interaction size two, values of the item decision variables and the pair decision variable determined by the optimizer are received from the optimizer. This step may be performed by the solution logic 150 of FIGS. 1 and 2. The receiving may be performed by accessing data corresponding to the item decision variable values and pair decision variable in memory that is populated by the optimizer. The item decision variable values and pair decision variable values may be transmitted, via a network connection, to the solution logic 150.

For an interaction size two, the method includes creating a promotion price schedule for each item based, at least in part, on the values of the item decision variables and the pair decision values. This step may be performed by the solution logic 150 of FIGS. 1 and 2. A processor is controlled by the solution logic 150 to create the promotion price schedule (see FIG. 4).

In one embodiment, the method includes assigning the item's price in the period to a non-promotion price for the item when an item decision variable for a period has a value of zero; assigning the item's price in the period to a promotion price associated with the item decision variable when an item decision variable for a period has a value of one; and assigning the pair of items' prices in the period to promotion prices associated with the pairs decision variable when a pair decision variable for a period has a value of one. This step may be performed by the solution logic 150 of FIGS. 1 and 2. A processor is controlled by the solution logic 150 to create the promotion price schedule (see FIG. 4).

In one embodiment, an electronic communication that includes the promotion price schedule is transmitted, by way of a network or internet connection, to a computing device of the retailer. In one embodiment, the promotion price schedule causes the computing device of the retailer to modify/adjust prices of items in data records of an inventory/pricing database according to the promotion price schedule. The modified/adjusted prices provide a pricing solution to improve the selected objective function in a manner that observes the selected constraints.

It can be seen from the foregoing description that the systems and methods described herein provide promotion price scheduling utilizing a multiple product demand model and also take into account business related constraints on item pricing. The described systems and methods are scalable and work for a general class of problems with any non-linear demand function and allow for incorporation of business related constraints and selection of a preferred objective function.

For simplicity sake in this description the terms objective function, approximate objective function, coefficient, variable, constraint, and value have been used. It is to be understood that these terms are to be interpreted as meaning data or data structures that encode the objective function, approximate objective function, coefficient, variable, constraint, and value in a manner interpretable by the computing elements described above. Inputting, outputting, receiving, transmitting, or other manipulation of these terms is to be interpreted as storing data in a storage medium, reading data from a storage medium, transmitting or receiving data by way of a network connection, acting on the data with a processor, as appropriate. Further, the term retailer should be interpreted as a computing device or devices under control of a retailer seeking a promotion price schedule and pricing items according to the promotion price schedule produced by the systems and methods described herein.

Computing Device Embodiment

Figure 4:
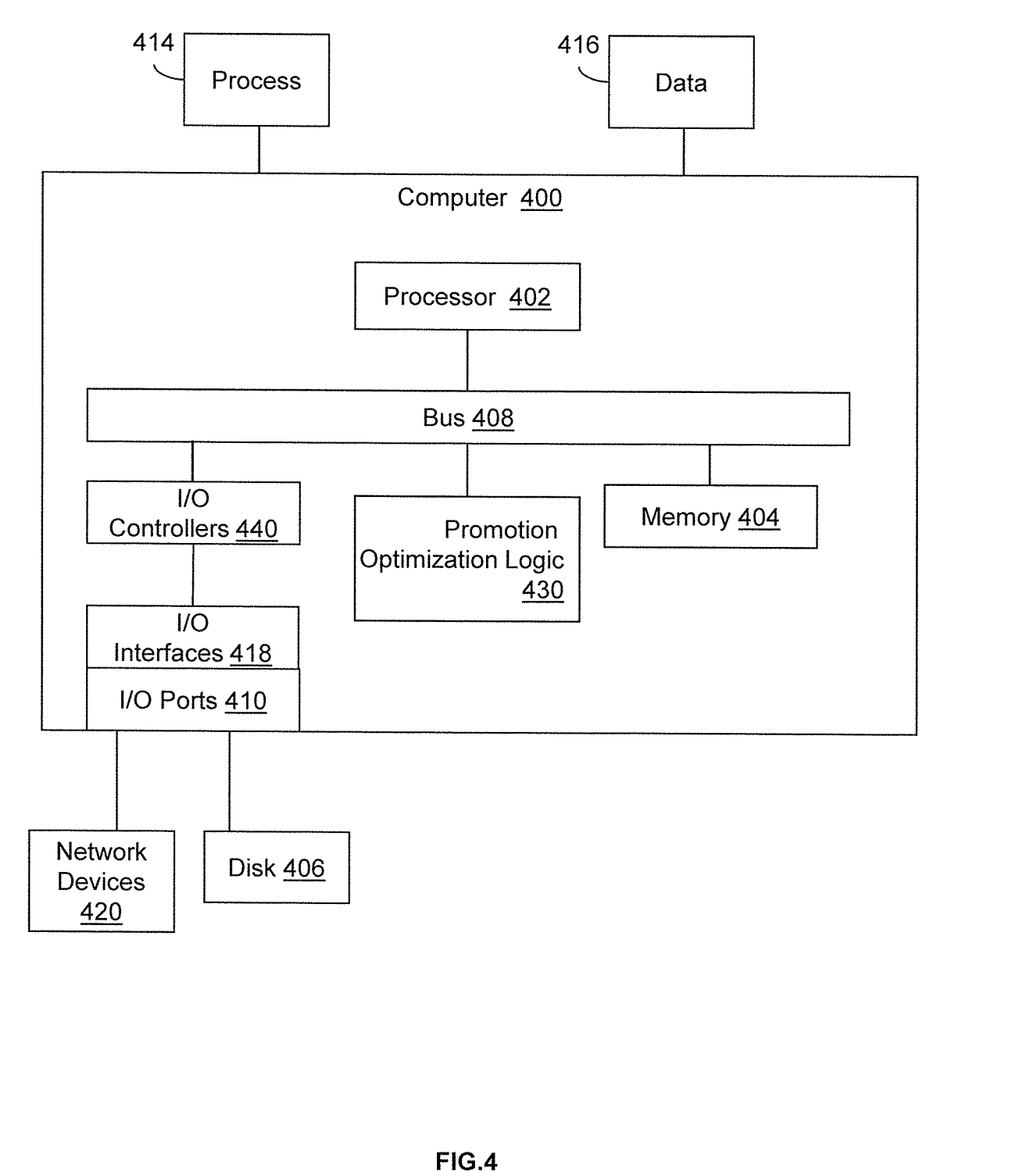
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include promotion optimization logic 430 configured to create a promotion price schedule utilizing a multiple product demand model in a manner similar to the promotion optimization logic 110 shown in FIG. 1 and further explained in FIG. 2. In different examples, the promotion optimization logic 430 may be implemented in hardware, a non-transitory computer-readable medium with stored instructions, firmware, and/or combinations thereof. While the promotion optimization logic 430 is illustrated as a hardware component attached to the bus 408, it is to be appreciated that in other embodiments, the promotion optimization logic 430 could be implemented in the processor 402, stored in memory 404, or stored in disk 406.

In one embodiment, promotion optimization logic 430 or the computer is a means (e.g., structure: hardware, non-transitory computer-readable medium, firmware) for performing the actions described in FIGS. 1-3. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform the method 300 of FIG. 3, as further explained in FIGS. 1 and 2. The means may also be implemented as stored computer executable instructions that are presented to computer 400 as data 416 that are temporarily stored in memory 404 and then executed by a processor 402.

Promotion optimization logic 430 may also provide means (e.g., hardware, non-transitory computer-readable medium that stores executable instructions, firmware) for performing the method 300 of FIG. 3, as further explained in FIGS. 1 and 2.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a compact disk-read only memory (CD-ROM) drive, a CD recordable (CD-R) drive, a CD read/write (CD-RW) drive, a digital video disc (DVD) ROM, and so on. The memory 404 can store a process 414 and/or a data 416, for example. The disk 406 and/or the memory 404 can store an operating system that controls and allocates resources of the computer 400.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and universal serial bus (USB) ports.

The computer 400 can operate in a network environment and thus may be connected to the network devices 420 via the I/O interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a wide area network (WAN), and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the functions as described herein when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User" or "Retailer", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

APPENDIX A

| | Constraint | Mathematical Expression |
|---|---|---|
| C1 | Price Calculation | $p_t^i = \sum_{k=0}^{K} q^k \gamma_t^{ik}$ |
| C2 | Self No-Touch | $\sum_{\tau=t}^{t+S_i} \sum_{k=1}^{K} \gamma_\tau^{ik} \leq 1 \forall\, i, t$ |
| C3 | Cross No-Touch | $\sum_{k=1}^{K} \gamma_t^{ik} + \sum_{\tau=t}^{t+S_{ij}} \sum_{k=1}^{K} \gamma_\tau^{jk} \leq 1 \forall\, (i, j), t \in T$ |
| C4 | Maximum Price Changes Per Item | $\sum_{t=1}^{T} \sum_{k=1}^{K} \gamma_t^{ik} \leq L_i \forall\, i$ |
| C5 | Maximum Price Changes Per Period | $\sum_{i=1}^{N} \sum_{k=1}^{K} \gamma_t^{ik} \leq N_t \forall\, i$ |
| C6 | Maximum Price Changes Per Category | $\sum_{t=1}^{T} \sum_{i=1}^{N} \sum_{k=1}^{K} \gamma_t^{ik} \leq U$ |

APPENDIX A-continued

| Constraint | | Mathematical Expression |
|---|---|---|
| C7 | Must-Promote Set | $\sum_{k=1}^{K} \gamma_t^{ik} = \sum_{k=1}^{K} \gamma_t^{jk} \; \forall \; (i, j), t \in T$ |
| C8 | Cannot-Promote Set | $\sum_{k=1}^{K} \gamma_t^{ik} + \sum_{k=1}^{K} \gamma_t^{jk} \leq 1 \; \forall \; (i, j), t \in T$ |
| C9 | Inter-Item Price | $\sum_{k=1}^{K} \gamma_t^{ik} = \sum_{k=1}^{K} \gamma_t^{jk} \; \forall \; (i, j), t \in T$ |
| C10 | Decision Variables Must Be Binary | $\gamma_\tau^{ik} \in \{0,1\} \; \forall \; i, t, k$ |
| C11 | Price ladder (one price must be picked from the price ladder) | $\sum_{k=0}^{K} \gamma_\tau^{ik} = 1 \; \forall \; i, t$ |

The invention claimed is:

1. A non-transitory computer-readable medium storing computer-executable instructions, that when executed by at least one processor of a computing device, cause the computing device to determine a promotion price schedule to be charged for each item in a group of items by a retailer computing device that is remote from the computing device by:

receiving, with the at least one processor, a set of promotion prices for each item in the group, wherein the set of promotion prices limits permissible promotion prices to be charged by the retailer computing device for the item to a discrete number of prices that are input to the computing device;

with the at least one processor, and for each item, each time period in the price schedule, and each promotion price in the set for the item, determining an item coefficient that corresponds to a change in a value of an objective function when the item is priced at the promotion price, where the objective function is based on a non-linear demand model that is a function of i) past prices of the item charged by the retailer computing device during a previous time period that preceded a current time period, and ii) current prices of different items in the group being charged by the retailer computing device during the current time period;

formulating, with the at least one processor, an approximate objective function that: (i) is a linear approximation of the non-linear demand model based on the discrete number of prices included in the set of promotion prices, and (ii) includes a sum of products, where each product includes at least one of the item coefficients multiplied by a binary item decision variable;

transmitting, with the at least one processor, the item coefficients, the approximate objective function, and one or more constraints to an optimizer that is configured to determine values of the item decision variables that maximize the approximate objective function, wherein the one or more constraints comprise a cross no-touch constraint that defines at least a minimum period of time that is to elapse between time periods when the promotion price for different items in the group can be offered;

generating, with the at least one processor, the promotion price schedule for each item based on at least values of the item decision variables determined by the optimizer, and generating a data structure stored in memory containing the promotion price schedule; and controlling, with the at least one processor, the retailer computing device by transmitting the data structure containing the promotion price schedule to the retailer computing device over a network connection, causing the retailer computing device to modify prices charged by the retailer computing device for a plurality of the items in the group to the promotion prices in the promotion price schedule.

2. The non-transitory computer-readable medium of claim 1, further comprising instructions, that when executed by the at least one processor, cause the computing device to determine the promotion price schedule for each item by:

computing a pair coefficient for each pair of items, each time period in the price schedule, and each combination of two of promotion prices, where a first promotion price in the combination is selected from the set of promotion prices for a first item in the pair and a second promotion price in the combination is selected from the set of promotion prices for a second item in the pair, further where the pair coefficient corresponds to a change in a value of the objective function when the first item is priced at the first promotion price and the second item is priced at the second promotion price;

formulating the approximate objective function such that the approximate objective function includes a sum of products, where each product includes a pair coefficient multiplied by a binary pair decision variable;

providing the pair coefficients with the item coefficients, the approximate objective function, and one or more constraints to the optimizer, where the optimizer is configured to determine, as constrained by the one or more constraints, values of the item decision variables and the pair decision variables that maximize the approximate objective function; and creating the promotion price schedule for each item based on at least the values of the item decision variables and the pair decision variables determined by the optimizer.

3. The non-transitory computer-readable medium of claim 2, further comprising instructions, that when executed by the at least one processor, cause the computing device to create the promotion price schedule for an item by:

when an item decision variable for a period has a value of zero, assigning the item's price in the period to a non-promotion price for the item;

when an item decision variable for a period has a value of one, assigning the item's price in the period to a promotion price associated with the item decision variable; and when a pair decision variable for a period has a value of one, assigning the first item's price in the period to the first promotion price associated with the pair decision variable and assigning the second item's price in the period to the second promotion price associated with the pair decision variable.

4. The non-transitory computer-readable medium of claim 1, where the one or more constraints further comprise a maximum number of items in the group that are assigned a promotion price during a same period.

5. The non-transitory computer-readable medium of claim 1, where the one or more constraints further specifies a must-promote set of items, wherein if one item in the must-promote set is assigned a promotion price in a given period, all other items in the must-promote set must also be assigned a promotion price during a same period.

6. The non-transitory computer-readable medium of claim 1, where the one or more constraints further specifies a cannot-promote set of items, wherein if one item in the cannot-promote set is assigned a promotion price in a given period, none of the other items in the cannot-promote set may be assigned a promotion price during a same period.

7. The non-transitory computer-readable medium of claim 1, where the one or more constraints further comprise a fixed relationship between prices of given items in the group that must be maintained in all periods.

8. A computing system configured to determine a promotion price schedule to be charged for each item in a group of items by a retailer computing device that is remote from the computing device, the computing system comprising:
   at least one processor connected to at least one memory;
   a non-transitory computer readable medium operably connected to the at least one processor and configured with a formulation logic configured with instructions that when executed by the at least one processor, cause the at least one processor to:
      receive, a set of promotion prices for each item in the group, wherein the set of promotion prices limits permissible promotion prices to be charged by the retailer computing device for the item to a discrete number of prices that are input to the computing system;
      for each item, each time period in the price schedule, and each promotion price in the set for the item, generate an item coefficient that corresponds to a change in a value of an objective function when the item is priced at the promotion price, where the objective function is based on a non-linear demand model that is a function of i) past prices of the item charged by the retailer computing device during a previous time period that preceded a current time period, and ii) current prices of different items in the group being charged by the retailer computing device during the current time period;
      formulate an approximate objective function that: (i) is a linear approximation of the non-linear demand model based on the discrete number of prices included in the set of promotion prices, and (ii) includes a sum of products, where each product includes at least one of the item coefficients multiplied by a binary item decision variable;
      transmit the item coefficients, the approximate objective function, and one or more constraints to an optimizer that is configured to determine values of the item decision variables that maximize the approximate objective function, wherein the one or more constraints comprise a cross no-touch constraint that defines at least a minimum period of time that is to elapse between time periods when the promotion price for different items in the group can be offered; and
   solution logic stored on the non-transitory computer readable medium and configured with instructions that when executed by the at least one processor, cause the at least one processor to:
      receive, from the optimizer, the values of the item decision variables;
      generate a promotion price schedule for each item based on at least the values of the item decision variables; and
      control the retailer computing device by transmitting the promotion price schedule to the retailer computing device over a network connection, to cause the retailer computing device to modify prices charged by the retailer computing device for a plurality of the items in the group to the promotion prices in the promotion price schedule.

9. The computing system of claim 8, where the solution logic is further configured to:
   when an item decision variable for a period has a value of zero, assign the item's price in the period to a non-promotion price for the item; and
   when an item decision variable for a period has a value of one, assign the item's price in the period to a promotion price associated with the item decision variable.

10. The computing system of claim 8, where:
   the formulation logic is further configured to:
      compute a pair coefficient for each pair of items, each time period in the price schedule, and each combination of two of promotion prices, where a first promotion price in the combination is selected from the set of promotion prices for a first item in the pair and a second promotion price in the combination is selected from the set of promotion prices for a second item in the pair, further where the pair coefficient corresponds to a change in a value of the objective function when the first item is priced at the first promotion price and the second item is priced at the second promotion price;
      formulate the approximate objective function such that the approximate objective function includes a sum of products, where each product includes a pair coefficient multiplied by a binary pair decision variable;
      provide the pair coefficients with the item coefficients, the approximate objective function, and one or more constraints to the optimizer, where the optimizer is configured to determine values of the item decision variables and the pair decision variables that maximize the approximate objective function; and
   the solution logic is further configured to:
      receive, from the optimizer, the values of the item decision variables and the pair decision variables; and
      create the promotion price schedule each item based on at least the values of the item decision variables and the pair decision variables.

11. The computing system of claim 10, where the solution logic is further configured to, when a pair decision variable for a period has a value of one, assign the first item's price in the period to the promotion price associated with the pair decision variable and assigning the second item's price in the period to the promotion price associated with the pair decision variable.

12. A computer-implemented method for determining a promotion price schedule to be charged for each item in a group of items by a retailer computing device that is remote from a computing device, the method comprising:
   receiving, a set of promotion prices for each item in the group with the computing device, wherein the set of promotion prices limits permissible promotion prices to be charged by the retailer computing device for the item to a discrete number of prices that are input to the computing device;
   for each item, each time period in the price schedule, and each promotion price in the set for the item, determine an item coefficient that corresponds to a change in a value of an objective function when the item is priced at the promotion price, where the objective function is based on a non-linear demand model that is a function of i) past prices of the item charged by the retailer computing device during a previous time period that preceded a current time period, and ii) current prices of different items in the group being charged by the retailer computing device during the current time period;

formulating an approximate objective function that: (i) is a linear approximation of the non-linear demand model based on the discrete number of prices included in the set of promotion prices, and (ii) includes a sum of products, where each product includes at least one of the item coefficients multiplied by a binary item decision variable;

transmitting the item coefficients, the approximate objective function, and one or more constraints to an optimizer that is configured to determine values of the item decision variables that maximize the approximate objective function, wherein the one or more constraints comprise a cross no-touch constraint that defines at least a minimum period of time that is to elapse between time periods when the promotion price for different items in the group can be offered;

generating, a promotion price schedule for each item based on at least values of the item decision variables determined by the optimizer, and generating a data structure stored in memory containing the promotion price schedule; and control the retailer computing device by transmitting the data structure containing the promotion price schedule to the retailer computing device over a network connection, causing the retailer computing device to modify prices of items in data records according to the corresponding values in the promotion price schedule.

13. The computer-implemented method of claim 12, further comprising:

computing a pair coefficient for each pair of items, each time period in the price schedule, and each combination of two of promotion prices, where a first promotion price in the combination is selected from the set of promotion prices for a first item in the pair and a second promotion price in the combination is selected from the set of promotion prices for a second item in the pair, further where the pair coefficient corresponds to a change in a value of the objective function when the first item is priced at the first promotion price and the second item is priced at the second promotion price;

formulating the approximate objective function such that the approximate objective function includes a sum of products, where each product includes a pair coefficient multiplied by a binary pair decision variable;

providing the pair coefficients with the item coefficients, the approximate objective function, and one or more constraints to the optimizer, where the optimizer is configured to determine, as constrained by the one or more constraints, values of the item decision variables and the pair decision variables that maximize the approximate objective function; and creating the promotion price schedule for each item based on at least the values of the item decision variables and the pair decision variables determined by the optimizer.

14. The computer-implemented method of claim 13, further comprising:

when an item decision variable for a period has a value of zero, assigning the item's price in the period to a non-promotion price for the item;

when an item decision variable for a period has a value of one, assigning the item's price in the period to a promotion price associated with the item decision variable; and when a pair decision variable for a period has a value of one, assigning the first item's price in the period to the first promotion price associated with the pair decision variable and assigning the second item's price in the period to the second promotion price associated with the pair decision variable.

15. The computer-implemented method of claim 12, where the one or more constraints further comprise a maximum number of items in the group that are assigned a promotion price during a same period.

16. The computer-implemented method of claim 12, where the one or more constraints further specifies a must-promote set of items, wherein if one item in the must-promote set is assigned a promotion price in a given period, all other items in the must-promote set must also be assigned a promotion price during a same period.

17. The computer-implemented method of claim 12, where the one or more constraints further specifies a cannot-promote set of items, wherein if one item in the cannot-promote set is assigned a promotion price in a given period, none of the other items in the cannot-promote set may be assigned a promotion price during a same period.

18. The computer-implemented method of claim 12, where the one or more constraints further comprise a fixed relationship between prices of given items in the group that must be maintained in all periods.

* * * * *

UNITED STATES PATENT AND TRADEMARK OFFICE
CERTIFICATE OF CORRECTION

PATENT NO. : 10,740,782 B2
APPLICATION NO. : 14/942225
DATED : August 11, 2020
INVENTOR(S) : Cohen et al.

It is certified that error appears in the above-identified patent and that said Letters Patent is hereby corrected as shown below:

On the Title Page

Column 1, Item (73) under Assignee, Line 2, delete "CORPOATION," and insert
-- CORPORATION, --, therefor.

Column 1, Item (73) under Assignee, Line 3, delete "MASSACHUSETS" and insert
-- MASSACHUSETTS --, therefor.

In the Specification

In Column 6, Line 25, delete "price)" and insert -- price --, therefor.

In Column 8, Line 8, delete "$\eta==2$," and insert -- $\eta=2$, --, therefor.

In Column 8, Line 11, delete "$i^{th}$" and insert -- $l^{th}$ --, therefor.

In Column 8, Line 25, delete "$b^{klju}=$" and insert -- $b_t^{klju}=$ --, therefor.

In Column 10, Line 39, delete "(q)" and insert -- ($\eta$) --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*